US009245025B2

(12) United States Patent
Chen

(10) Patent No.: US 9,245,025 B2
(45) Date of Patent: Jan. 26, 2016

(54) SYSTEMS, METHODS, AND COMPUTER-READABLE MEDIA FOR SEARCHING FOR EVENTS FROM A COMPUTER-IMPLEMENTED CALENDAR

(71) Applicant: GOOGLE Inc., Mountain View, CA (US)

(72) Inventor: Lei Chen, Santa Monica, CA (US)

(73) Assignee: GOOGLE INC., Mountain View, CA (US)

( * ) Notice: Subject to any disclaimer, the term of this patent is extended or adjusted under 35 U.S.C. 154(b) by 25 days.

(21) Appl. No.: 13/761,780

(22) Filed: Feb. 7, 2013

(65) Prior Publication Data
US 2014/0222857 A1 Aug. 7, 2014

(51) Int. Cl.
G06F 7/00 (2006.01)
G06F 17/30 (2006.01)

(52) U.S. Cl.
CPC .............................. G06F 17/30864 (2013.01)

(58) Field of Classification Search
USPC ......................................................... 707/769
See application file for complete search history.

(56) References Cited

U.S. PATENT DOCUMENTS

| 6,611,842 | B1* | 8/2003 | Brown |
| 6,625,595 | B1* | 9/2003 | Anderson et al. |
| 6,636,853 | B1* | 10/2003 | Stephens, Jr. |
| 7,584,114 | B2 | 9/2009 | Estrada |
| 8,280,984 | B2 | 10/2012 | Lance |
| 2001/0049617 | A1* | 12/2001 | Berenson et al. ................. 705/8 |
| 2002/0152224 | A1* | 10/2002 | Roth et al. .................. 707/104.1 |
| 2007/0274519 | A1* | 11/2007 | Cohen et al. ................... 380/201 |
| 2008/0250334 | A1* | 10/2008 | Price .............................. 715/753 |
| 2008/0307323 | A1* | 12/2008 | Coffman et al. ............... 715/753 |
| 2009/0152349 | A1* | 6/2009 | Bonev et al. ................... 235/383 |
| 2009/0157513 | A1* | 6/2009 | Bonev et al. ..................... 705/14 |
| 2010/0088336 | A1 | 4/2010 | Johnston |
| 2010/0298034 | A1 | 11/2010 | Shin et al. |
| 2010/0317370 | A1 | 12/2010 | Feng |
| 2011/0184943 | A1* | 7/2011 | Norton et al. ................. 707/723 |

(Continued)

FOREIGN PATENT DOCUMENTS

| JP | 2003227723 A | 8/2003 |
| KR | 10-0590982 B1 | 6/2006 |

(Continued)

OTHER PUBLICATIONS

International Search Report & Written Opinion for PCT App. No. PCT/US2014/015093, mailed Sep. 3, 2014. (pp. 1-10).

(Continued)

Primary Examiner — Hosain Alam
Assistant Examiner — Nicholas Allen
(74) Attorney, Agent, or Firm — Marshall, Gerstein & Borun LLP

(57) ABSTRACT

Provided are systems, methods, and computer-readable media for searching for events from a computer-implemented calendar in accordance. A search interface is provided in a user interface element in response to a user selection to create a new calendar event. A search query and selected event categories are received from the search interface and search results responsive to the search query are provided in the user interface element. A selection to save a search result item is received, and an event details interface is provided. After event details are submitted by the user, a new calendar event is created based on the selected search result item.

11 Claims, 7 Drawing Sheets

(56) References Cited

U.S. PATENT DOCUMENTS

| | | | |
|---|---|---|---|
| 2011/0289065 A1 | 11/2011 | Wells | |
| 2011/0289422 A1* | 11/2011 | Spivack et al. | 715/739 |
| 2012/0004942 A1* | 1/2012 | Callanan et al. | 705/7.22 |
| 2012/0185486 A1* | 7/2012 | Voigt et al. | 707/741 |
| 2012/0297312 A1 | 11/2012 | Lance | |

FOREIGN PATENT DOCUMENTS

| | | |
|---|---|---|
| KR | 10-0714245 B1 | 5/2007 |
| KR | 10-2010-0050884 A1 | 5/2010 |
| WO | 2010083525 A1 | 7/2010 |
| WO | 2011/107655 A1 | 9/2011 |

OTHER PUBLICATIONS

International Preliminary Report on Patentability for Application No. PCT/US2014/015093, dated Aug. 20, 2015.

* cited by examiner

SYSTEMS, METHODS, AND COMPUTER-READABLE MEDIA FOR SEARCHING FOR EVENTS FROM A COMPUTER-IMPLEMENTED CALENDAR

BACKGROUND OF THE INVENTION

1. Field of the Invention

This invention relates generally to computer-implemented calendars, and more particularly, to creating calendar events on such calendars.

2. Description of the Related Art

The Internet is useful for a variety of purposes. For example, users may use the Internet for e-mail and other electronic communication, shopping, computer-implemented searches, and so on. One purpose may include creation and use of computer-implemented calendars. Such calendars enable a user to schedule events, invite people to events, receive notifications of events, and perform other actions. In some instances, a user may forget to add desired events to a computer-implemented calendar. Additionally, adding events to a computer-implemented calendar may be cumbersome, especially if the user is not familiar with the computer-implemented calendar. Moreover, a user may not understand how to add events to a calendar or invite other users to an event.

SUMMARY OF THE INVENTION

Various embodiments of systems, methods, and computer-readable media for searching for events from a computer-implemented calendar are provided herein. In some embodiments, a method is provided that includes providing, by one or more processors, a computer-implemented calendar associated with a user and receiving from the user, by one or more processors, a first user selection to create a calendar event. Additionally, the method includes providing, by one or more processors, a search interface in a user interface element and receiving, by one or more processors, a search query from the user via the search interface. The method further includes providing, by one or more processors, a plurality of search results to the user in the user interface element and receiving from the user, by one or more processors, a second user selection to add a selected one of the plurality of search results as a calendar event to the computer-implemented calendar. Finally, the method also includes adding, by one or more processors, the selected one of plurality of search results to the computer-implemented calendar and storing, by one or more processors, event information about the selected one of the plurality of search results.

In some embodiments, a non-transitory tangible computer-readable storage medium for searching from a computer-implemented calendar is provided. The non-transitory tangible computer-readable medium includes executable computer code stored thereon. The executable computer code includes a set of instructions that causes one or more processors to perform the following: providing, by one or more processors, a computer-implemented calendar associated with a user and receiving from the user, by one or more processors, a first user selection to create a calendar event. Additionally, the executable computer code includes a set of instructions that causes one or more processors to perform the following: providing, by one or more processors, a search interface in a user interface element and receiving, by one or more processors, a search query from the user via the search interface. The executable computer code further includes a set of instructions that causes one or more processors to perform the following: providing, by one or more processors, a plurality of search results to the user in the user interface element and receiving from the user, by one or more processors, a second user selection to add a selected one of the plurality of search results as a calendar event to the computer-implemented calendar. Finally, the executable computer code also includes a set of instructions that causes one or more processors to perform the following: adding, by one or more processors, the selected one of plurality of search results to the computer-implemented calendar and storing, by one or more processors, event information about the selected one of the plurality of search results.

Additionally, in some embodiments a system for searching from a computer-implemented calendar is provided. The system includes one or more processors and a tangible non-transitory memory accessible by the one or more processors, the memory having computer code stored thereon. The memory includes executable computer code stored thereon. The executable computer code includes a set of instructions that causes one or more processors to perform the following: providing, by one or more processors, a computer-implemented calendar associated with a user and receiving from the user, by one or more processors, a first user selection to create a calendar event. Additionally, the executable computer code includes a set of instructions that causes one or more processors to perform the following: providing, by one or more processors, a search interface in a user interface element and receiving, by one or more processors, a search query from the user via the search interface. The executable computer code further includes a set of instructions that causes one or more processors to perform the following: providing, by one or more processors, a plurality of search results to the user in the user interface element and receiving from the user, by one or more processors, a second user selection to add a selected one of the plurality of search results as a calendar event to the computer-implemented calendar. Finally, the executable computer code also includes a set of instructions that causes one or more processors to perform the following: adding, by one or more processors, the selected one of plurality of search results to the computer-implemented calendar and storing, by one or more processors, event information about the selected one of the plurality of search results.

Figure 1A:
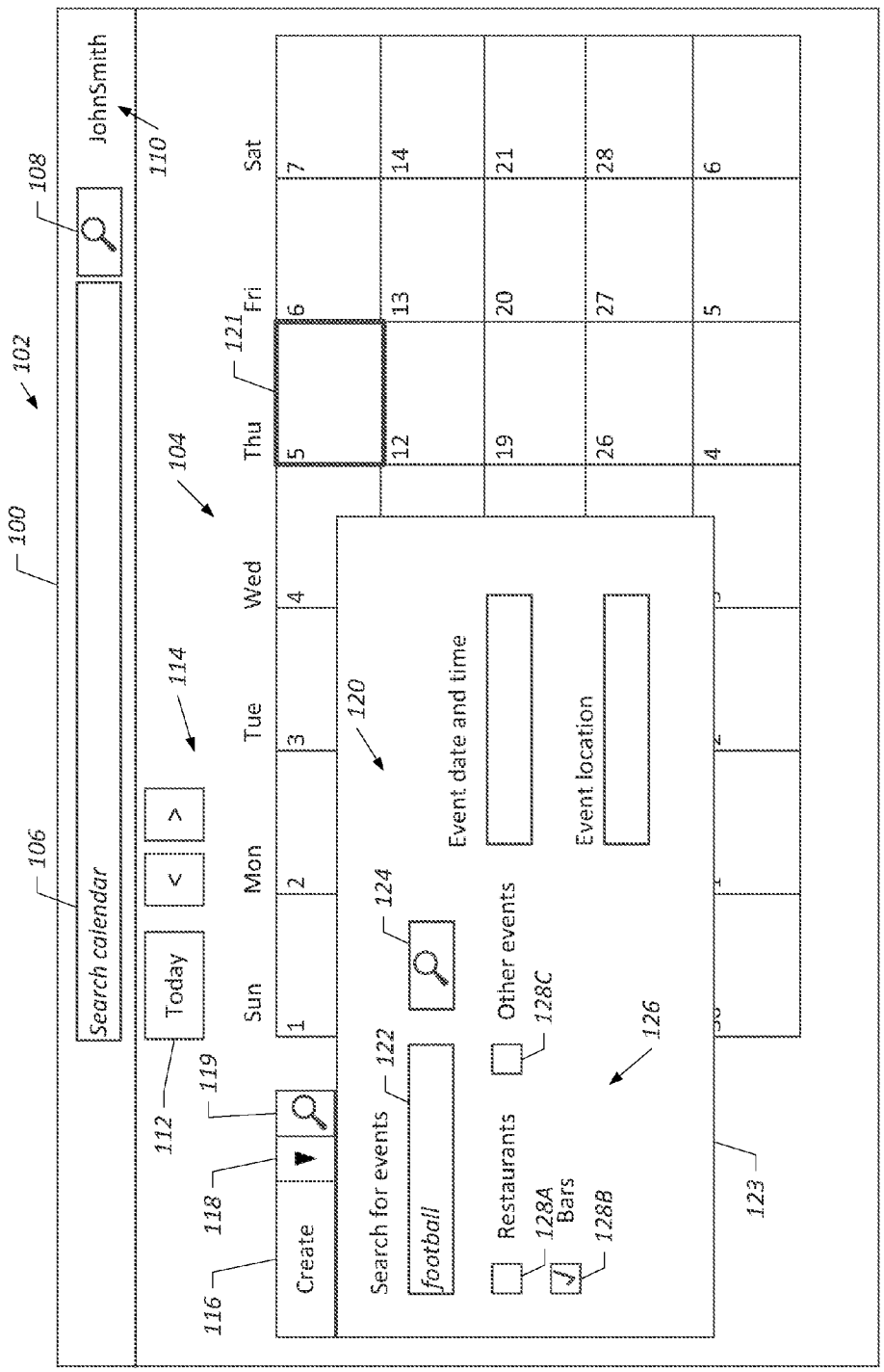
FIGS. 1A-1D are schematic diagrams that depict screens illustrating searching for events for a computer-implemented calendar application in accordance with embodiments of the present invention.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION

As discussed in more detail below, provided in some embodiments are systems, methods, and computer-readable media for searching for events from a computer-implemented calendar. A user may initiate creation of an event for a computer-implemented calendar for a date selected on the computer-implemented calendar. Upon receiving a user selection to create an event, a search interface may be provided in a user interface element in the computer-implemented calendar. The search interface includes a search field, a search control (e.g., a search button), and selectable event categories. A user may enter a search query in the search field and select the search control to execute a search based on the search query. Additionally, a user may select one or more of the selectable event categories to restrict the search to specific event categories.

After a user selects the search control, the search query is received and search results responsive to the search query are retrieved. The search results are provided in the user interface element having the search interface. Each search result item is provided with a save control that enables a user to save the selected search result item as a calendar event in the computer-implemented calendar. A user may select the save control associated with a search result item to create a calendar event based on the selected search result item. In response to the user selection of the save control, an event details interface is provided to the user. The event details interface enables the user to enter an event title, event start date, event start time, event end date, event end time, event location, event description, attendees, and other event details. After a user submits event details, a calendar event based on the selected search result item is added to the computer-implemented calendar. For example, a link associated with the new calendar event is added to the computer-implemented calendar.

FIG. 1 is a schematic diagram of a screen 100 of a computer-implemented calendar application 102 in accordance with an embodiment of the present invention. The computer-implemented calendar application includes a computer-implemented calendar 104 associated with a user. In some embodiments, the computer-implemented calendar application 102 is implemented as a web application displayed in a browser. In such an embodiment, the screen 100 may depict a screen of a browser or other application for viewing web content. In other embodiments, the computer-implemented calendar application 102 is implemented as a standalone application, such as a native application or other type of application for a client computer.

The computer-implemented calendar application 102 includes various functions, described further below, for interacting with the computer-implemented calendar 104. It should be appreciated that the computer-implemented calendar application 102 described herein is merely one example and embodiments of a computer-implemented calendar application 102 and computer-implemented calendar 104 may include additional or alternative functionality. In some embodiments, the computer-implemented calendar application 102 may include a calendar search field 104 and a calendar search control 106 (e.g., a button). The computer-implemented calendar application 102 also includes a user identifier 110 that indicates the user associated with the computer-implemented calendar 104. In some embodiments, the user identifier 110 may be a username, an email address, or other identifier associated with a user. Additionally, a user may be associated with the computer-implemented calendar 104 by logging into the computer-implemented calendar application 102 or logging into an entity or service that provides the computer-implemented calendar application 102. The calendar search field 106 and calendar search control 108 enable a user to search the computer-implemented calendar 104 for events, attendees, or other data included in the computer-implemented calendar 104. For example, a user may enter a search term, such as an event title, in the calendar search field 106 and select the calendar search control 108 to execute a search of the computer-implemented calendar 104.

The computer-implemented calendar application 102 may include controls, such as buttons, checkboxes, and so on, that provide various functions. It should be appreciated that the computer-implemented calendar 104 may display any specific time period, such as one day, one work week, one week, one month, multiple months, and the like. For example, the computer-implemented calendar application 102 may include additional controls to enable selection of a specific time period. Additionally, as described below, a user may select a specific date displayed in the computer-implemented calendar 104 by selecting (e.g., clicking) on the specific date (e.g., a day, week, month, and so on).

As shown in FIG. 1A, the computer-implemented calendar application 102 includes a current date control 112 that enables a user to display the current date in the computer-implemented calendar 104. Additionally, the computer-implemented calendar application 102 includes previous and next controls 114 that enable a user to select a previous time period and next time period for display in the computer-implemented calendar 104. The controls 114 may be context sensitive based on the period displayed in the computer-implemented calendar 104. For example, if the computer-implemented calendar 104 displays a week, the previous and next controls 114 enable a user to select a previous week or next week for display in the computer-implemented calendar 104. Similarly, if the computer-implemented calendar 104 displays a month, the previous and next controls 114 enable a user to select a previous month or a next month for display in the computer-implemented calendar.

As shown in FIG. 1A, the computer-implemented calendar application 102 also includes a create events control 116, a quick add control 118, and an event search control 119. The create events control 116 enables a user to create a calendar event for addition to the computer-implemented calendar 104. A user may select the create a create event control 116 to proceed to an event details interface that enables a user to enter details about an event and submit the event for inclusion in the computer-implemented calendar 104. The event search control 119 (e.g., a button) enables a user to initiate display of a search interface 120, described further below, that provides for a user to search for an event to add to the computer-implemented calendar 104. In some embodiments, an event is created for a selected date on the computer-implemented calendar 104. For example, as shown in FIG. 1A, the date of Sep. 5, 2013 is a selected date 121. The selected date 121 may be indicated by highlighting the selected date or providing another indication of the selection.

As shown in FIG. 1A, the search interface 120 is displayed in response to a user selection of the event search control 119. The search interface 120 may be asynchronously provided with respect to the other components in the screen 100. The search interface 120 is displayed in a user interface element 123 in the computer-implemented calendar application 102. For example, the search interface 120 may be displayed in an inline frame, a window, or other user interface element within the screen 100 of the computer-implemented calendar application. Advantageously, the search interface 120 is displayed coincident with the computer-implemented calendar 104 such that a user does not need to navigate to a different screen to search for an event to add to the computer-implemented calendar 104.

The search interface 120 includes a search field 122 and a search control 124 (e.g., a button). Additionally, the search interface 120 includes selectable event categories 126. In some embodiments, the search interface 120 includes an event date and time field 125 and an event location field 127. The search field 122 and search control 124 enable a user to enter and execute a search query for an event that the user desires to add to the computer-implemented calendar 104. For example, a user may enter a search query in the search field 122 and select the search control 124 to execute the search. As shown in FIG. 1A, for example, the text "football" is entered in the search field 122. The user may enter a date, time, or both in the event date and time field 125 and may enter a location, e.g., a zip code, city, state, and the like, in the event location field 127. The selectable event categories 126 enable a user to restrict a search in the search interface 120 to different event categories 126. As shown in FIG. 1A, in some embodiments the selectable event categories 126 may be provided as selectable checkboxes 128 associated with the respective event categories. The selectable event categories 126 may include any type of event suitable for addition as a calendar event to the computer-implemented calendar 104. In some embodiments, the selectable event categories 126 may include restaurants, movies, plays, concerts, bars, flights, trains, buses, museums, art galleries, food, nightlife, shopping, lounges, beauty and spas, local services, home services, or any other suitable event categories. As shown in FIG. 1A, the event category "Bars" is selected by a user, as indicated by the check in the checkbox 128B associated with the event category "Bars."

After entering a search query (e.g., "football") in the search field 122 and, in some embodiments, selecting one or more of the selectable event categories 126 (e.g., "Bars"), a user executes the search by selecting the search control 124. After executing the search, search results are provided in the search interface 120. A user may then select a search result to add the search result to the computer-implemented calendar 104 as a calendar event.

Figure 1B:
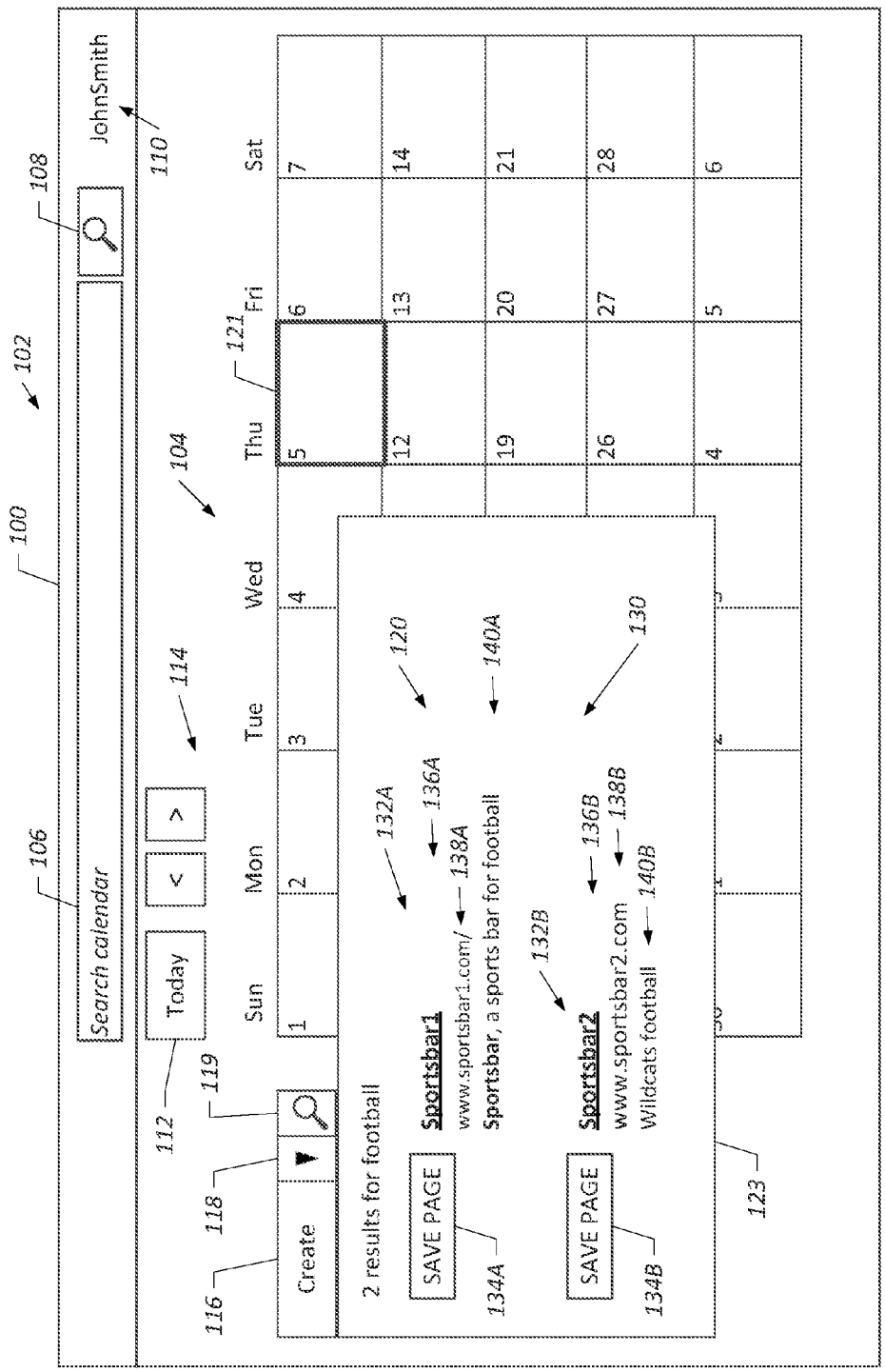

FIG. 1B further depicts the screen 100 of the computer-implemented calendar application 102 and illustrates the display of search results 130 in the search interface 120 in accordance with an embodiment of the present invention. As described above, the computer-implemented calendar application 102 includes a computer-implemented calendar 104, a calendar search field 106, a calendar search button 108, and a user identifier 110. As shown in FIG. 1B, search results 130 responsive to a user's search query are displayed in the search interface. The search interface 120 may indicate the number of search results responsive to the search query (e.g., "2 results for football"). The user interface element 123 that includes the search interface 120 may also include a scroll bar if the results are unable to be displayed entirely in the user interface element 123.

The search results 130 are responsive to the search query entered by the user in the search field 122. Additionally, the search results 130 are restricted by the user's selections of one or more of the selectable event categories 126. For example, as noted above, the search results 130 depicted in FIG. 1B are responsive to a search query having the term "football." Moreover, the search results 130 are restricted by the selected event category of "Bars" shown in FIG. 1A. Accordingly, the search results 130 include a first item 132A and a second item 132B responsive to the search query and selected event category. Additionally, each search result is displayed with a "Save Page" control 134. For example, the first item 132A is associated with a "Save Page" control 134A and the second item 132B is displayed with a "Save Page" control 134B.

Each item in the search results 130 may be displayed with information associated with the search results, such as a hyperlink 136, a URL 138, and a description 140. For example, as shown in FIG. 1B, the first item 132A includes a hyperlink 136A (e.g., "Sportsbar1"), a URL 138A (e.g., www.sportsbar1.com) and a description 140A (e.g., "Sportsbar, a sports bar for football"). Similarly, the second item 132B includes a hyperlink 136B, a URL 138B, and a description 140B.

As mentioned above, each item 132 in the search results may be associated with an event creation control 134. As shown in the figure, the first item 132A is associated with the "Save Page" button 134A. A user may save a search result item as a new calendar event by selecting the "Save Page" button associated with the search result item. Thus, if a user desires to add the first item 132A to the computer-implemented calendar 104 as a new calendar event, the user may select the "Save Page" control 134A. In some embodiments, the event creation control 134 may be based on the type of item displayed next to the control. For example, if the item in the search results 130 is a restaurant, the event creation control may include the text "Book a table." In another example, if the item in the search results 130 is a sports event, the event creation control may include the text "Book a ticket."

Figure 1C:
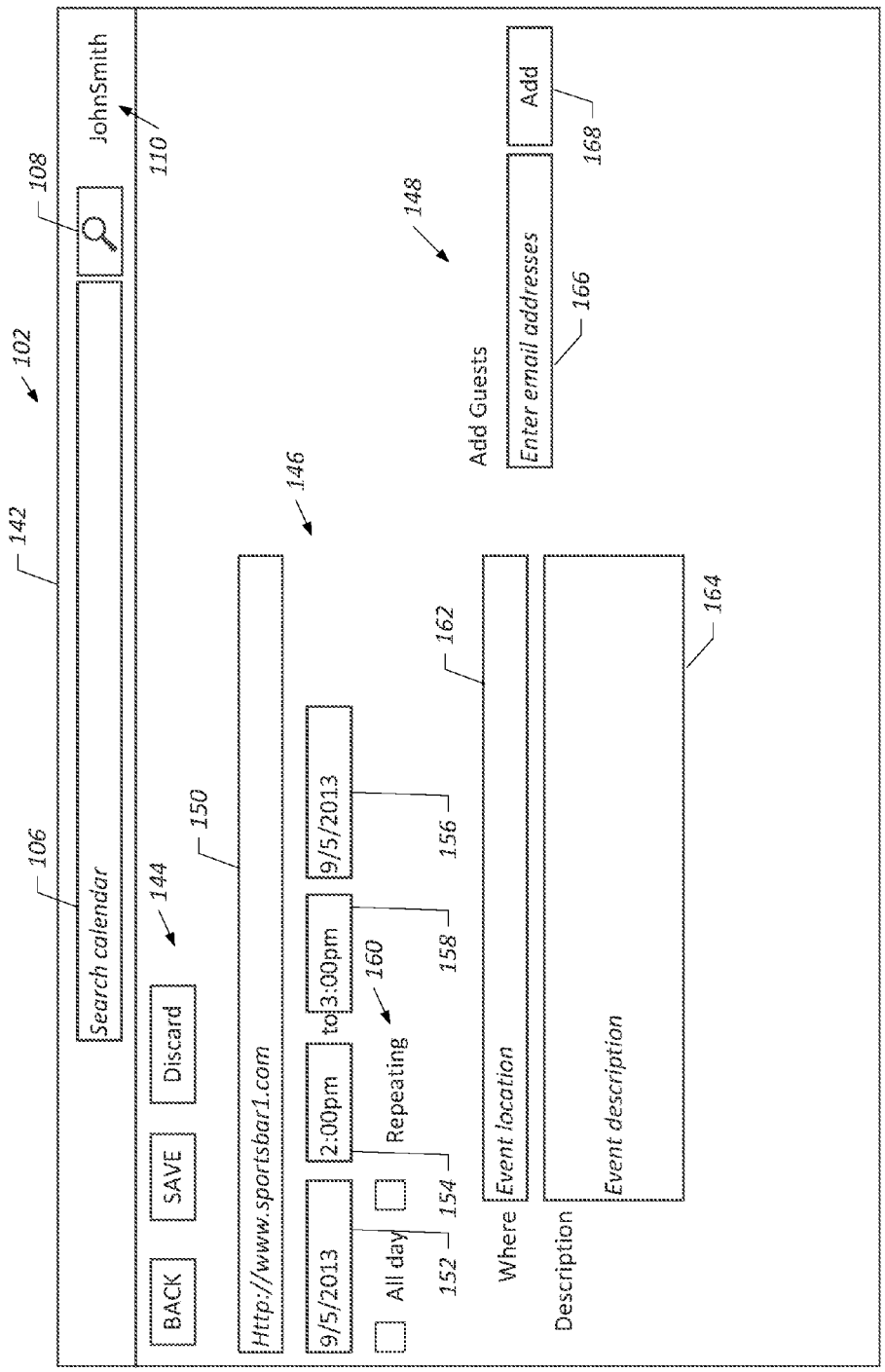

After a user selects to save a search result item to the computer-implemented calendar 104 as a new calendar event, a user may enter event details about the new calendar event. FIG. 1C depicts a screen 142 of the computer-implemented calendar application 102 that depicts an event details interface 143 in accordance with an embodiment of the present invention. In some embodiments, the event details interface 143 is provided in a different screen, e.g., screen 142, of the computer-implemented calendar 104. In other embodiments, the event details interface 143 is provided in a user interface element within the screen 100 of the computer-implemented calendar application 102.

As shown in FIG. 1C, the screen 142 includes the calendar search field 106, the calendar search button 108, and the user identifier 110 that function in the manner described above. The screen 142 depicts navigation controls 144, event details section 146, and attendee ("Guest") section 148. The navigation controls 144 include controls for submitting or discarding event details for an event. For example, as shown in FIG. 1C, the navigation controls 144 may include a "Back" control 144A that enables a user to return to the screen 100 displaying the computer-implemented calendar 104. The navigation controls 144 also include a "Save" control 144B that enables a user to submit the event details entered via the event details interface 143 and a "Discard" control 144C that enables a user to discard any event details entered via the screen 144.

The event details section 146 includes an event title field 150, an event start date field 152, an event start time field 154, an event end date field 156, an event end time field 158, and event options 160. The event title field 150 receives an event title for the new calendar event. In some embodiments, the event title entered into the event title field 150 is used as the event identifier on the computer-implemented calendar 104 to identify the event. Additionally, in some embodiments, the event title field 150 may be auto-populated with text of the URL associated with the selected search result item that initiated creation of a new calendar event. For example, as shown in FIG. 1C, for the selected item 132A ("Sportsbar1") the event title field 150 is auto-populated with the URL 138A (www.sportsbar1.com) associated with the item 132A. Thus, a user may accept the auto-populated text entered in the event title field 150 or edit the text entered in the event title field 150.

The start date field 152 and start time field 154 may receive a start date and start time respectively for the new calendar event. Similarly, the end date field 156 and end time field 158 may receive an end date and end time for the new calendar event. In some embodiments, the start date field 152 and end date field 156 are auto-populated with the selected date 121 selected on the computer-implemented calendar 104 (e.g., Sep. 5, 2013). In some embodiments, the start time field 154 and the end time field 158 are auto-populated with a default start time and default end time. For example, the start time field 154 may be auto-populated with the current time, the nearest hour to the current time, the nearest half-hour to the current time, or other time. The end time field 158 may be auto-populated based on the start time and a default event duration. For example, in some embodiments the default event duration may be 30 minutes, 1 hour, 2 hours, 3 hours, or any other duration.

The event details section 146 also includes an event location field 162 that receives a location associated with the new calendar event and an event description field 164 that receives a description associated with the new calendar event. In some embodiments, the event location field 162 may be auto-populated with a location associated with the selected search result item 132A that was saved as the new calendar event. Similarly, in some embodiments the event description field 164 may be auto-populated with a description (e.g., the description 140A) associated with the selected search result item 132A that was saved as the new calendar event.

The attendee section 148 enables a user to invite attendees (also referred to as "guests") to the new calendar event such that the event is associated with one or more other attendees. In some embodiments, the attendees receive an invitation that enables the attendees to add the calendar event to their respective computer-implemented calendars. As shown in FIG. 1C, the attendees section 148 includes an email address field 166 and an attendee add control 168. To add an attendee to the new calendar event, a user may enter an email address in the email address field 166 and select the attendee add control 168. After selecting the attendee add control 168, the attendee may be displayed in the attendees section 148 and the email address field 166 may reset to enable the further addition of additional attendees. In some embodiments, as noted above, the attendees may receive an email invitation to the event. Such email invitations may include, for example, the ability to "accept" or "decline" an event, and such acceptances or declinations may be associated with the event and accessed by the user from the computer-implemented calendar 104. Moreover, it should be appreciated that although the attendee invitations may be transmitted via email, in other embodiments attendee invitations may be transmitted via any suitable communication medium, such as text messages (e.g., SMS messages).

Figure 1D:
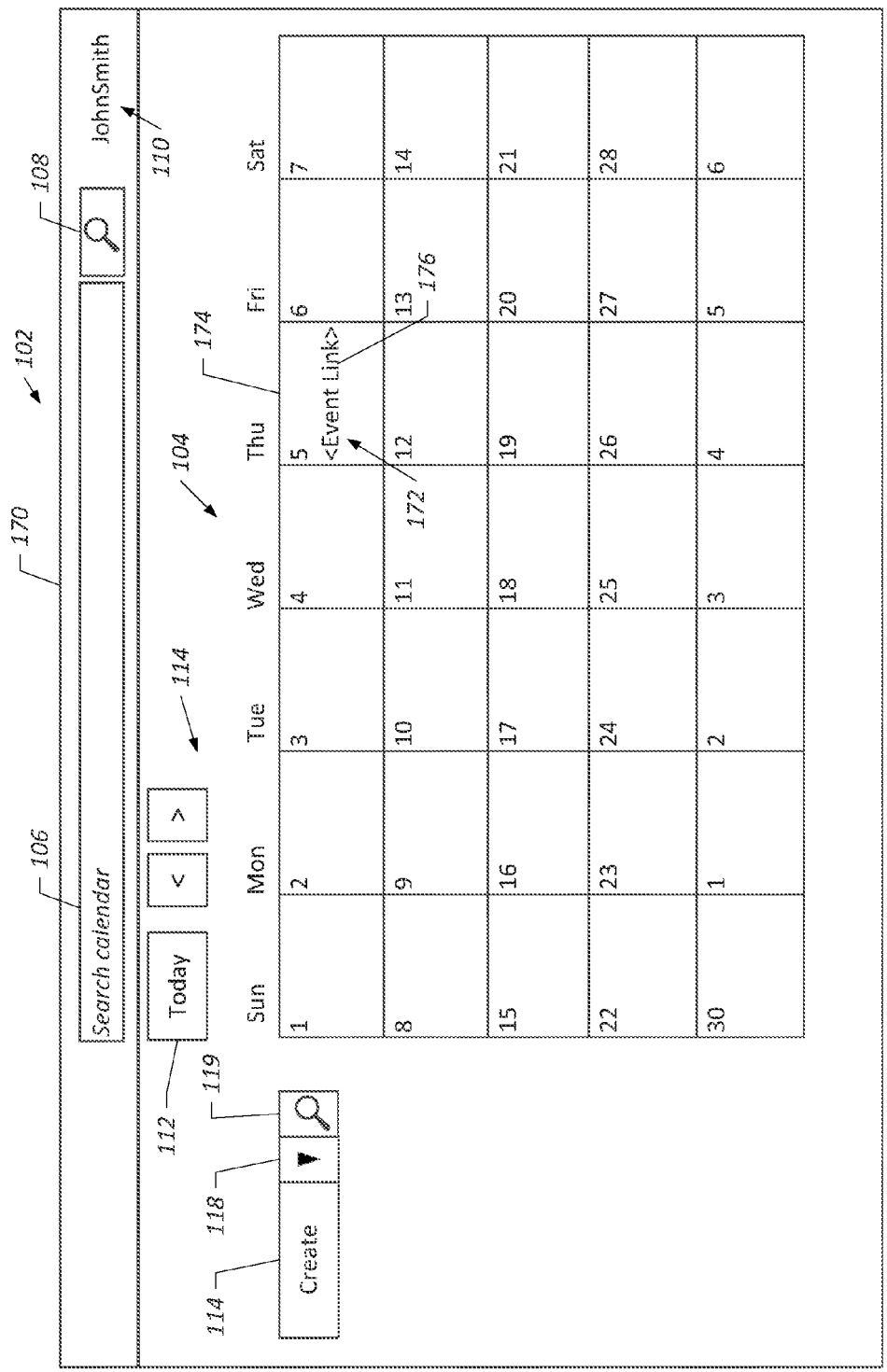

After entering event details for the new calendar event, a user may select the "Save" control 144B to submit the event details and complete the addition of the new calendar event to the computer-implemented calendar 104. FIG. 1D depicts a screen 170 of the computer-implemented calendar application 102 in accordance with an embodiment of the present invention. As shown in FIG. 1D, the screen 170 may again include the various components described above, such as the calendar search field 106, the calendar search button 108, the user identifier 110, the current date control 112 that enables a user to display the current date in the computer-implemented calendar 104, the previous and next controls 114, the create event control 116, the quick add control 118, and the event search control 119.

After selecting a search result item to add to the computer-implemented calendar 104, the selected search result item 132A is added as a calendar event to the computer-implemented calendar 104. As shown in FIG. 1D, a calendar event 172 is added to the computer-implemented calendar 104 on the selected date 121. In some embodiments, a link 176 to the event ("<Event Link>") may be displayed on the computer-implemented calendar 104. In some embodiments, the link 176 may include the event title or other text associated with the calendar event 172. A user may select the link 176 to view the event 172, edit event details, invite additional attendees, and perform other actions related to the event 172.

Figure 2:
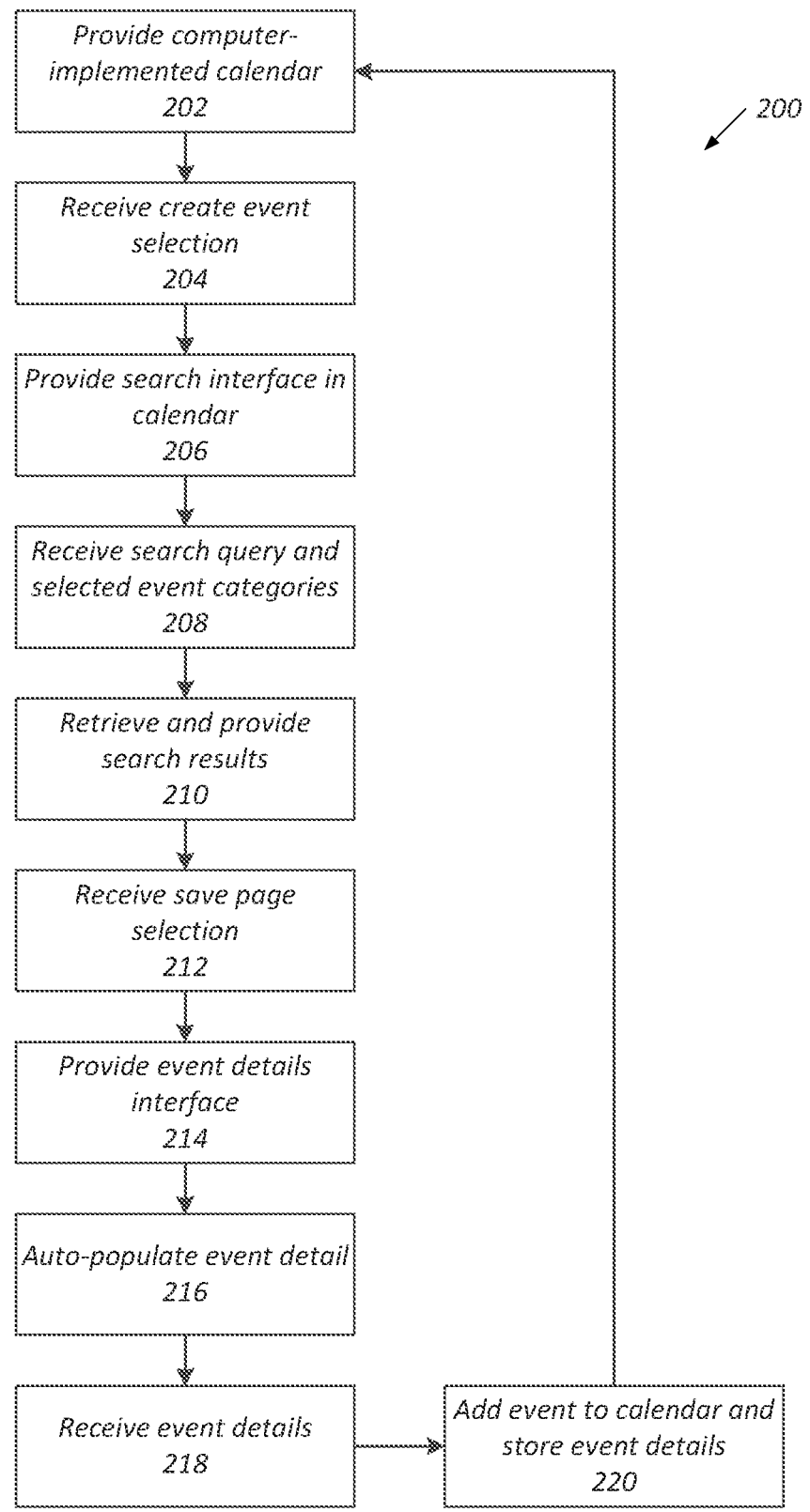
FIG. 2 is a block diagram of a process for providing a search for calendar events from a computer-implemented calendar in accordance with embodiments of the present invention.

FIG. 2 depicts a process 200 for providing a search for calendar events from a computer-implemented calendar in accordance with an embodiment of the present invention. Some or all steps of the process 200 may be implemented as executable computer code stored on a non-transitory tangible computer-readable storage medium and executed by one or more processors of a special-purpose machine, e.g., a computer programmed to execute the code. Initially, a computer-implemented calendar is provided to a user (block 202). As stated above, in some embodiments the computer-implemented calendar is provided in a computer-implemented calendar application, such as web application, a native application, or other application. Next, a selection to create an event is received (block 204), such as from a user's selection of a control in a computer-implemented calendar application.

After receiving a selection to create an event, a search interface is provided (block 206) in the computer-implemented calendar, such as in a user interface element of the computer-implemented calendar application. As mentioned above, in some embodiments, the search interface is asynchronously provided. As described above, the search interface may include a search field that receives a search query from a user and selectable event categories for restricting a search. Next, a search query and, in some embodiments, one or more selected event categories, are received from a user (block 208). As described above, a user may enter a search query in a search field, select one or more event categories, and select a search control to submit the search query. After receiving a search query from the user, search results responsive to the search query and restricted to selected event categories are retrieved and provided to the user (block 210).

As described above, each item in the search results is associated with a "Save Page" control that enables the user to save an item as new calendar event in the computer-implemented calendar. Accordingly, a "Save Page" selection for a search item is received from a user (block 212). After receiving the selection to save a search result item as a new calendar event, an event details interface is provided in the computer-implemented calendar application (block 214). For example, as described above, the event details interface may be provided in another screen, such as in another webpage, in the computer-implemented calendar application. Moreover, in some embodiments, some event details are auto-populated based on the data associated with the selected search result item (block 216), such as a URL associated with the search result item. Additionally, some event details, such as event start date and event end date, are based on a date selected on the computer-implemented calendar.

After a user enters and submits event details for the new calendar event, the event details are received (block 218). After receiving event details, the event is added to the computer-implemented calendar and the event details associated with the event are stored (block 220). For example, as described above, in some embodiments a link to the calendar event is added to the computer-implemented calendar and displayed on the event date. Finally, the screen of the computer-implemented calendar application having the computer-implemented calendar is then provided to the user (block 202). A user may search for and create additional new calendar events resulting in the re-execution of one or more steps of the process 200.

Figure 3:
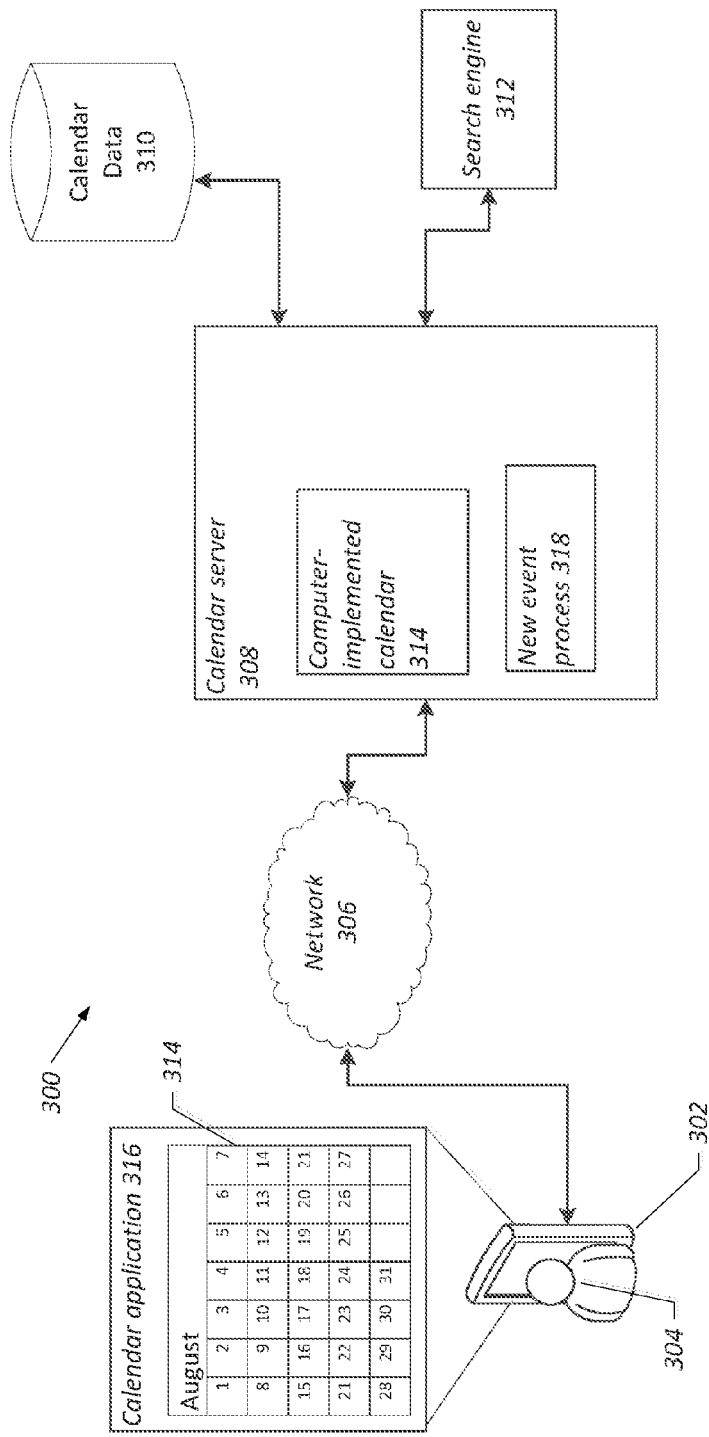
FIG. 3 is a block diagram of a system for providing a search for calendar events from a computer-implemented calendar in accordance with embodiments of the present invention.

FIG. 3 depicts a system 300 for providing a computer-implemented calendar and searching for new calendar events in accordance with an embodiment of the present invention. As shown in FIG. 3, the system 300 may include a client computer 302 for a user 304, a network 306, and a calendar server 308 (e.g., one or more servers). The client computer 302 may include laptop computers, tablet computers, smartphones, personal digital assistants, etc., and may include a receiver for a satellite-based positioning system, such as a Global Positioning System (GPS) receiver. The client computer 302 may also be capable of determining a location via other positioning data, such as Wi-Fi location data, cellular tower multilateration, and other data. In some embodiments, the client computer 302 may include a desktop computer. As described below, a user may use the client computer 302 to retrieve computer-implemented calendars and add, remove, and edit calendar events.

The calendar server 308 may be a single server (in a discrete hardware component or as a virtual server) or multiple servers. The server 308 may include web servers, application servers, or other types of servers. Additionally, the server 308 may be, for example, computers arranged in any physical and virtual configuration, such as computers in one or more data processing centers, a distributed computing environment, or other configuration. Such configurations may use the network 306 for communication or may communicate over other networks.

The client computer 302 and server 308 are in communication with the network 306, such as through a wired or wireless network interface. In some embodiments, the network 306 may include multiple networks, and may include any suitable network and networking technology, such as the Internet, an intranet, a local area network (LAN), a wide area network (WAN), or any other suitable network. Additionally, the network 306 may include a wired network, a wireless network, or both. Moreover, it should be appreciated that the client computer 302 and server 308 may communicate over different networks separately and simultaneously. For example, the client computer 302 may communicate over both a wireless Ethernet network and a cellular network. Additionally, other components of the system 300 may communicate over the network 306 or different networks.

The calendar server 308 includes or accesses calendar data 310. For example, calendar data 310 includes one or more computer-implemented calendars associated with the user 304. Such calendars include calendar events having associated event details, such as an event title, an event location, event start date and time, event end date and time, event description, guests invited to the event and so on. The calendar data 310 may be stored in a database or other data structures, and may be stored on the calendar server 308 or another server that is accessible by the calendar server 308. The calendar server 308 is also in communication with a search engine 312 that may include, for example, a search index and other components for facilitating computer-implemented searching of the Internet. For example, the search engine 312 may index and search web pages of the World Wide Web (WWW). The search engine 312 may execute a search based on a search query entered by the user 304 and transmitted via the calendar server 308 to the search engine 312. In other embodiments, a search query entered by the user 304 may be directly transmitted to the search engine 312.

As shown in FIG. 3, the calendar server 308 provides a computer-implemented calendar 314 to the client computer 302 for viewing and editing by the user 304. As will be appreciated, the computer-implemented calendar 314 may be provided by the calendar server 308 based on the calendar data 310. As described above, the user 304 may access the computer-implemented calendar 314 in a computer-implemented calendar application 316. As described above, in some embodiments the computer-implemented calendar application 316 is provided as a web application, such that the computer-implemented calendar 314 is provided in a webpage accessed via a web browser executing on the client computer 302. In other embodiments the calendar application 316 is a native application or other application executing on the client computer 302. The user 302 may add, remove, and edit calendar events on the computer-implemented calendar 314 using the client computer 302, such as through a user interface provided by the calendar application 316.

As described above, the user may use the computer-based calendar application 316 to search for an event to add to the computer-implemented calendar 316. Using the computer-based calendar application 316, a search query and, in some instances, selected event categories, are entered and transmitted to the calendar server 308. The calendar server 308 executes an event process 318 for processing the search query and creating a new calendar event based on the user's selections. The calendar server 308 transmits the search query to the search engine 312 to retrieve search results provided by the search engine 312. The search results are then transmitted to the client computer 302 and provided in the calendar application.

As described above, a user selects the "Save Page" control associated with a search result item and the selection is transmitted to the calendar server 308. The event details interface is then transmitted to the client computer 302 and provided in the calendar application 316. After entering event details via the client device 302, the user's entry and submission of event details is transmitted to the calendar server 308 and a new calendar event is created in the computer-implemented calendar. Additionally, as mentioned above, the event details associated with the calendar event are stored, such as by storing the new calendar event and event details in the calendar data 310. The updated computer-implemented calendar 314 may be transmitted from the calendar server 308 to the client computer 302 and viewed by the user in the computer-implemented calendar application 316.

Figure 4:
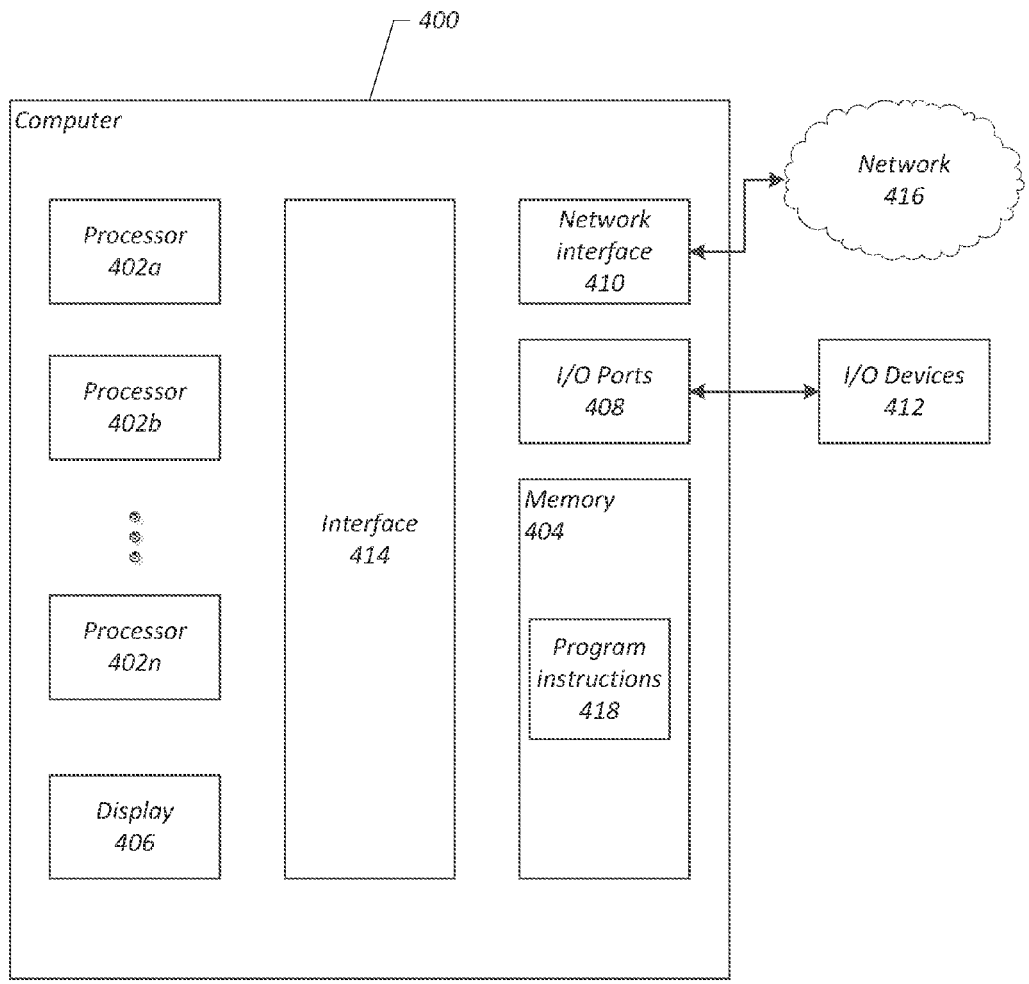
FIG. 4 is a block diagram of a computer in accordance with an embodiment of the present invention.

FIG. 4 depicts a computer 400 (e.g., a client computer, a server, etc.) in accordance with an embodiment of the present invention. Various portions or sections of systems and methods described herein include or are executed on one or more computers similar to computer 400 and programmed as special-purpose machines executing some or all steps of methods described above as executable computer code. Further, processes and modules described herein may be executed by one or more processing systems similar to that of computer 400.

The computer 400 may include various internal and external components that contribute to the function of the device and which may allow the computer 400 to function in accordance with the techniques discussed herein. As will be appreciated, various components of computer 400 may be provided as internal or integral components of the computer 400 or may be provided as external or connectable components. It should further be noted that FIG. 4 depicts merely one example of a particular implementation and is intended to illustrate the types of components and functionalities that may be present in computer 400. As shown in FIG. 4, the computer 400 may include one or more processors (e.g., processors 402a-402n) coupled to a memory 404, a display 406, I/O ports 408 and a network interface 410, via an interface 414.

Computer 400 may include any combination of devices or software that may perform or otherwise provide for the performance of the techniques described herein. For example, computer 400 may include or be a combination of a cloud-computing system, a data center, a server rack or other server enclosure, a server, a virtual server, a desktop computer, a laptop computer, a tablet computer, a mobile telephone, a personal digital assistant (PDA), a media player, a game console, a vehicle-mounted computer, or the like. The computer 400 may be a unified device providing any one of or a combination of the functionality of a media player, a cellular phone, a personal data organizer, a game console, and so forth. Computer 400 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

In addition, the computer 400 may allow a user to connect to and communicate through a network 416 (e.g., the Internet, a local area network, a wide area network, etc.) and to acquire data from a satellite-based positioning system (e.g., GPS). For example, the computer 400 may allow a user to communicate using e-mail, text messaging, instant messaging, or using other forms of electronic communication, and may allow a user to obtain the location of the device from the satellite-based positioning system, such as the location on an interactive map.

In one embodiment, the display 406 may include a liquid crystal display (LCD) or an organic light emitting diode (OLED) display, although other display technologies may be used in other embodiments. The display 406 may display a user interface (e.g., a graphical user interface). In accordance with some embodiments, the display 406 may include or be provided in conjunction with touch sensitive elements through which a user may interact with the user interface. Such a touch-sensitive display may be referred to as a "touch screen" and may also be known as or called a touch-sensitive display system.

The processor 402 may provide the processing capability required to execute the operating system, programs, user interface, and any functions of the computer 400. The processor 402 may receive instructions and data from a memory (e.g., system memory 404). The processor 402 may include one or more processors, such as "general-purpose" microprocessors, and special purpose microprocessors, such as ASICs. For example, the processor 402 may include one or more reduced instruction set (RISC) processors, such as those implementing the Advanced RISC Machine (ARM) instruction set. Additionally, the processor 402 may include single-core processors and multicore processors and may include graphics processors, video processors, and related chip sets. Accordingly, computer 400 may be a uni-processor system including one processor (e.g., processor 402a), or a multi-processor system including any number of suitable processors (e.g., 402a-402n). Multiple processors may be employed to provide for parallel or sequential execution of one or more sections of the techniques described herein. Processes, such as logic flows, described herein may be performed by one or more programmable processors executing one or more computer programs to perform functions by operating on input data and generating corresponding output.

The memory 404 (which may include one or more tangible non-transitory computer readable storage medium) may include volatile memory, such as random access memory (RAM), and non-volatile memory, such as ROM, flash memory, a hard drive, any other suitable optical, magnetic, or solid-state storage medium, or a combination thereof. The memory 404 may be accessible by the processor 402 and other components of the computer 400. The memory 404 may store a variety of information and may be used for a variety of purposes. The memory 404 may store executable computer code, such as the firmware for the computer 400, an operating system for the computer 400, and any other programs or other executable code necessary for the computer 400 to function. The executable computer code may include program instructions 418 executable by a processor (e.g., one or more of processors 402a-402n) to implement one or more embodiments of the present invention. For example, the process 300 described above may be implemented in program instructions 418. Instructions 418 may include modules of computer program instructions for implementing one or more techniques described herein with regard to various processing modules. Program instructions 418 may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, a subroutine. A computer program may or may not correspond to a file in a file system. A program may be stored in a section of a file that holds other programs or data (e.g., one or more scripts stored in a markup language document), in a single file dedicated to the program in question, or in multiple coordinated files (e.g., files that store one or more modules, sub programs, or sections of code). A computer program may be deployed to be executed on one or more computer processors located locally at one site or distributed across multiple remote sites and interconnected by a communication network. In addition, the memory 404 may be used for buffering or caching during operation of the computer 400. The memory 404 may also store data files such as media (e.g., music and video files), software (e.g., for implementing functions on computer 400), preference information (e.g., media playback preferences), wireless connection information (e.g., information that may enable media device to establish a wireless connection), telephone information (e.g., telephone numbers), and any other suitable data.

As mentioned above, the memory 404 may include volatile memory, such as random access memory (RAM). The memory 404 may also include non-volatile memory, such as ROM, flash memory, a hard drive, any other suitable optical, magnetic, or solid-state storage medium, or a combination thereof. The interface 414 may include multiple interfaces and may couple various components of the computer 400 to the processor 402 and memory 404. In some embodiments, the interface 414, the processor 402, memory 404, and one or more other components of the computer 400 may be implemented on a single chip, such as a system-on-a-chip (SOC). In other embodiments, these components, their functionalities, or both may be implemented on separate chips. The interface 414 may be configured to coordinate I/O traffic between processors 402a-402n, system memory 404, network interface 410, I/O devices 412, other peripheral devices, or a combination thereof. The interface 414 may perform protocol, timing or other data transformations to convert data signals from one component (e.g., system memory 404) into a format suitable for use by another component (e.g., processors 402*a*-402*n*). The interface 414 may include support for devices attached through various types of peripheral buses, such as a variant of the Peripheral Component Interconnect (PCI) bus standard or the Universal Serial Bus (USB) standard.

The computer 400 may also include an input and output port 408 to allow connection of additional devices, such as I/O devices 412. Embodiments of the present invention may include any number of input and output ports 408, including headphone and headset jacks, universal serial bus (USB) ports, Firewire or IEEE-1394 ports, and AC and DC power connectors. Further, the computer 400 may use the input and output ports to connect to and send or receive data with any other device, such as other portable computers, personal computers, printers, etc.

The computer 400 depicted in FIG. 4 also includes a network interface 410, such as a wired network interface card (NIC), wireless (e.g., radio frequency) receivers, etc. For example, the network interface 410 may receive and send electromagnetic signals and communicate with communications networks and other communications devices via the electromagnetic signals. The network interface 410 may include known circuitry for performing these functions, including an antenna system, an RF transceiver, one or more amplifiers, a tuner, one or more oscillators, a digital signal processor, a CODEC chipset, a subscriber identity module (SIM) card, memory, and so forth. The network interface 410 may communicate with networks (e.g., network 416), such as the Internet, an intranet, a cellular telephone network, a wireless local area network (LAN), a metropolitan area network (MAN), or other devices by wireless communication. The communication may use any suitable communications standard, protocol and technology, including Ethernet, Global System for Mobile Communications (GSM), Enhanced Data GSM Environment (EDGE), a 3G network (e.g., based upon the IMT-2000 standard), high-speed downlink packet access (HSDPA), wideband code division multiple access (W-CDMA), code division multiple access (CDMA), time division multiple access (TDMA), a 4G network (e.g., IMT Advanced, Long-Term Evolution Advanced (LTE Advanced), etc.), Bluetooth, Wireless Fidelity (Wi-Fi) (e.g., IEEE 802.11a, IEEE 802.11b, IEEE 802.11g or IEEE 802.11n), voice over Internet Protocol (VoIP), Wi-MAX, a protocol for email (e.g., Internet message access protocol (IMAP) or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), Multimedia Messaging Service (MMS), Short Message Service (SMS), or any other suitable communication protocol.

Those skilled in the art will also appreciate that, while various items are illustrated as being stored in memory or on storage while being used, these items or sections of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer 400 may be transmitted to computer 400 via transmission media or signals such as electrical, electromagnetic, or digital signals, conveyed via a communication medium such as a network or a wireless link. Various embodiments may further include receiving, sending or storing instructions or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible/readable storage medium may include a non-transitory storage media such as magnetic or optical media, (e.g., disk or DVD/CD-ROM), volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" mean including, but not limited to. As used throughout this application, the singular forms "a", "an" and "the" include plural referents unless the content clearly indicates otherwise. Thus, for example, reference to "an element" includes a combination of two or more elements. Unless specifically stated otherwise, as apparent from the discussion, it is appreciated that throughout this specification discussions utilizing terms such as "processing", "computing", "calculating", "determining" or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical electronic or magnetic quantities within memories, registers, or other information storage devices, transmission devices, or display devices of the special purpose computer or similar special purpose electronic processing/computing device.

What is claimed is:

1. A computer-implemented method for searching from a computer-implemented calendar, comprising:
   providing, by one or more processors, a computer-implemented calendar associated with a user;
   receiving from the user, by one or more processors, a first user selection to create a calendar event including an event start date and at least one of: an event start time, an event end time, an event end date, an event description, a uniform resource locator (URL) associated with the selected one of the plurality of search results, or an event description;
   in response to at least the first user selection to create the calendar event, providing, by one or more processors, a search interface element configured to be displayed coincident with the computer-implemented calendar;
   receiving, by one or more processors, a search query from the user via the search interface;
   providing, by one or more processors, a plurality of search results to the user;
   receiving from the user, by one or more processors, a second user selection to add event information about a selected one of the plurality of search results as a calendar event to the computer-implemented calendar;
   in response to at least the second user selection to add event information about a selected one of the plurality of search results as a calendar event, an event information interface to receive at least some of the event information from the user;
   receiving event information from the user via the event information interface, wherein the plurality of search results are each associated with a respective event creation control that, when selected, causes the event information interface to be displayed, and wherein at least some of the event creation controls are presented based on the respective search result such that a first event creation control is different from a second event creation control; and
   adding, by one or more processors, the event information about the selected one of plurality of search results to the computer-implemented calendar.

2. The computer-implemented method of claim 1, further comprising extracting event information from the selected one of the plurality of search results and auto-populating the event information interface with the extracted event information.

3. The computer-implemented method of claim 1, further comprising providing, by one or more processors, an interface to allow the user to invite a guest to the event.

4. The computer-implemented method of claim 3, further comprising:
   determining that the user has invited a guest and saved the event; and
   sending an invitation to the guest to attend the event.

5. The computer-implemented method of claim 1, wherein providing, by one or more processors, a computer-implemented calendar associated with a user, comprises transmitting, over a network, a webpage including the computer-implemented calendar to a client computer, and wherein:
   the search interface element comprises:
      a plurality of user-selectable categories of events,
      a search-interface event date field, and
      a search-interface event location field; and
   providing the plurality of search results to the user comprises searching based on at least one of the user-selectable categories of events selected by the user and a search query entered by the user in the search interface element.

6. The computer-implemented method of claim 1, wherein the search interface element comprises an inline frame or a window of the computer implemented calendar.

7. A non-transitory tangible computer-readable storage medium having executable computer code stored thereon for searching from a computer-implemented calendar, the code comprising a set of instructions that causes one or more processors to perform the following:
   providing, by one or more processors, a computer-implemented calendar associated with a user;
   receiving from the user, by one or more processors, a first user selection to create a calendar event including an event start date and at least one of: an event start time, an event end time, an event end date, an event description, a uniform resource locator (URL) associated with the selected one of the plurality of search results, or an event description;
   in response to at least the first user selection to create the calendar event, providing, by one or more processors, a search interface;
   receiving, by one or more processors, a search query from the user via the search interface;
   providing, by one or more processors, a plurality of search results to the user;
   receiving, by one or more processors, from the user, by one or more processors, a second user selection to add event information about a selected one of the plurality of search results as a calendar event of the computer-implemented calendar;
   in response to at least the second user selection to add event information about a selected one of the plurality of search results as a calendar event, an event information interface to receive at least some of the event information from the user;
   receiving event information from the user via the event information interface, wherein the plurality of search results are each associated with a respective event creation control that, when selected, causes the event information interface to be displayed, and wherein at least some of the event creation controls are presented based on the respective search result such that a first event creation control is different from a second event creation control;
   adding, by one or more processors, the event information about the selected one of plurality of search results to the computer-implemented calendar.

8. The non-transitory tangible computer-readable storage medium of claim 7, the code comprising a set of instructions that causes one or more processors to perform the following: extracting event information from the selected one of the plurality of search results and auto-populating the event information interface wherein extracting event information comprises obtaining a location previously associated with the selected one of the plurality of search results.

9. The non-transitory tangible computer-readable storage medium of claim 7, wherein providing, by one or more processors, a computer-implemented calendar associated with a user, comprises transmitting, over a network, a webpage including the computer-implemented calendar to a client computer, and wherein:
   the search interface comprises:
      a plurality of user-selectable categories of events,
      a search-interface event date field, and
      a search-interface event location field; and providing the plurality of search results to the user comprises searching based on at least one of the user-selectable categories of events selected by the user and a search query entered by the user in the search interface.

10. A system for searching from a computer-implemented calendar, the system comprising:
one or more processors;
a tangible non-transitory memory accessible by the one or more processors, the memory having computer code stored thereon, the code comprising instructions that cause at least some of the one or more processors to perform steps comprising:
providing a computer-implemented calendar associated with a user;
receiving from the use a first user selection to create a calendar event including an event start date and at least one of: an event start time, an event end time, an event end date, an event description, a uniform resource locator (URL) associated with the selected one of the plurality of search results, or an event description;
in response to at least the first user selection to create the calendar event, providing a search interface;
receiving a search query from the user via the search interface;
providing a plurality of search results to the user;
receiving from the user a second user selection to add event information about a selected one of the plurality of search results as a calendar event of the computer-implemented calendar;
in response to at least the second user selection to add event information about a selected one of the plurality of search results as a calendar event, an event information interface to receive at least some of the event information from the user;
receiving event information from the user via the event information interface, wherein the plurality of search results are each associated with a respective event creation control that, when selected, causes the event information interface to be displayed, and wherein at least some of the event creation controls are presented based on the respective search result such that a first event creation control is different from a second event creation control; and
adding the selected one of plurality of search results to the computer-implemented calendar.

11. The system of claim 10, the code comprising a set of instructions that causes one or more processors to perform steps comprising:
extracting event information from the selected one of the plurality of search results and auto-populating the event information interface with the extracted event information, and wherein:
extracting event information comprises obtaining a location previously associated with the selected one of the plurality of search results;
the search interface element comprises:
a plurality of user-selectable categories of events,
a search-interface event date field, and
providing the plurality of search results to the user comprises searching based on at least one of the user-selectable categories of events selected by the user and a search query entered by the user in the search interface element.

* * * * *